(12) United States Patent
Drummond et al.

(10) Patent No.: US 7,554,091 B2
(45) Date of Patent: *Jun. 30, 2009

(54) FEEDBACK CIRCUIT FOR OUTPUT CONTROL IN A SEMICONDUCTOR X-RAY DETECTOR

(75) Inventors: William E. Drummond, Mountain View, CA (US); David R. Fahrbach, Madison, WI (US); James V. Howard, Madison, WI (US); James R. Hyatt, Madison, WI (US); Kevin K. Kim, Madison, WI (US); Mark E. Misenheimer, Middleton, WI (US); Dean A. Stocker, Fitchburg, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/023,960

(22) Filed: Jan. 31, 2008

(65) Prior Publication Data
US 2008/0116384 A1   May 22, 2008

Related U.S. Application Data

(63) Continuation-in-part of application No. 11/495,867, filed on Jul. 28, 2006, now Pat. No. 7,339,175.

(51) Int. Cl.
*H01L 27/146* (2006.01)
*G01T 1/24* (2006.01)
(52) U.S. Cl. .............. 250/370.09; 250/370.01
(58) Field of Classification Search ............ 250/370.01, 250/370.09
See application file for complete search history.

(56) References Cited

U.S. PATENT DOCUMENTS 7,339,175 B1 * 3/2008 Drummond et al. .... 250/370.01

2006/0086906 A1 * 4/2006 Kiuru ................. 250/370.01

OTHER PUBLICATIONS

C. Fiorini, T. Frizzi, and A. Longoni. "A CMOS Charge Preamplifier for Silicon Drift Detectors in with On-chip JFET and Feedback Capacitor". Nuclear Instruments and Methods in Physics Research A: 568 (2006), 322-328.*

Lechner, P., S. Eckbauer, R. Hartmann, S. Krisch, D. Hauff, R. Richter, H. Soltau, L. Struder, C. Fiorini, E. Gatti, A. Longoni, and M. Sampietro. "Silicon Drift Detectors for High Resolution Room Temperature X-ray Spectroscopy." Nuclear Instruments and Methods in Physics Research A: 377(1996), 346-351.*

* cited by examiner

*Primary Examiner*—David P Porta
*Assistant Examiner*—Casey Bryant
(74) *Attorney, Agent, or Firm*—DeWitt Ross & Stevens; Michael C. Staggs

(57) ABSTRACT

An X-ray detector using a semiconductor detector, most preferably a Silicon Drift Detector, utilizes a field effect transistor or other voltage-controlled resistance to generate an output voltage proportional to its input charge (which is generated by the X-ray photons incident on the semiconductor detector). To keep the charge (and thus the output voltage) to an acceptable range—one wherein the relationship between output voltage and input charge is substantially proportional—a feedback circuit is provided between the output and input terminals, wherein the charge on the input terminal is depleted when the output voltage begins leaving the desired range. Preferably, this is done by a comparator which monitors the output voltage, and provides a reset signal to the input terminal when it begins moving out of range. Alternatively or additionally, the reset signal may be a pulse supplied to the input terminal from a pulse generator activated by the comparator.

17 Claims, 3 Drawing Sheets

FEEDBACK CIRCUIT FOR OUTPUT CONTROL IN A SEMICONDUCTOR X-RAY DETECTOR

CROSS-REFERENCE TO RELATED APPLICATIONS

This application is a continuation-in-part of U.S. patent application Ser. No. 11/495,867, filed Jul. 28, 2006 now U.S. Pat. No. 7,339,175, entitled "X-Ray Detector", which is incorporated by reference herein.

FIELD OF THE INVENTION

This document concerns an invention relating generally to X-ray detectors, and more specifically to X-ray detectors used in microanalysis and X-ray fluorescence measurement (e.g., in electron microscopes and X-ray spectrometers).

BACKGROUND OF THE INVENTION

X-ray detectors are used in electron microscopes (e.g., scanning electron microscopes and tunneling electron microscopes), X-ray spectrometers (e.g., X-ray fluorescence spectrometers/energy-dispersive X-ray spectrometers), and other instruments to analyze the composition and properties of materials. An illumination source (such as an electron beam or X-ray source) is directed at a sample to be analyzed, resulting in emission of X-rays from the sample wherein the X-rays (X-ray photons) have energies which are characteristic of the atoms of the sample from which they were emitted. Thus, the counts of the emitted X-rays (photons) and their energies can indicate the composition of the sample.

Traditionally, X-ray detectors utilized lithium-doped silicon detector (Si(Li)) detectors. These detectors are semiconductor detectors which generate a charge upon receiving X-rays, and thereby allow counting of X-ray photons and measurement of their energies. In an arrangement used by Thermo Electron Scientific Instruments (Madison, Wis., USA), the Si(Li) detector output was preamplified using a FET, i.e., a field effect transistor, and the signal at the FET output (drain) was then provided to a cascode amplifier and pulse processor. To keep the FET in its linear range, feedback was used from the FET output (drain) to the FET input (gate). While this arrangement worked well, it disadvantageously had a response which is rather slow by present standards—it could not accommodate X-ray photon counts of greater than approximately 60,000 counts per second—and additionally it required cooling to cryogenic temperatures for greatest accuracy.

In recent years, more advanced semiconductor detectors, such as Silicon Drift Detectors (SDDs), have become available, and these offer the possibility of far greater count rate measurement (a million counts per second or more) with lesser temperature control burdens (see, e.g., Iwanczyk et al., High Throughput High Resolution VorteX™ Detector for X-Ray Diffraction, IEEE Transactions On Nuclear Science, Vol. 50, No. 6, December 2003). Unfortunately, SDD's carry their own drawbacks, in particular the problem of varying detector response with x-ray illumination level: the SDDs, which often have an integrated FET provided for signal amplification purposes, have a gain which changes with voltage (Hansen et al., Dynamic Behavior of the Charge-to-Voltage Conversion in Si-Drift Detectors With Integrated JFETs, IEEE Transactions On Nuclear Science, Vol. 50, No. 5, October 2003). This results in variations in the measurements of detected X-rays, and in turn difficulties in interpreting their significance. For example, for a manganese K-alpha X-ray detected by an SDD, as the measured photon count rate goes from 10,000 counts per second (10 kcps) to 100 kcps, its measured energy can shift by 50-100 eV (a phenomenon known as peak shift), and resolution (the peak width on an intensity/counts vs. measured energy scale) can degrade by 10-30 eV. (Fiorini, C, A charge sensitive preamplifier for high peak stability in spectroscopic measurements at high counting rates, IEEE Transactions On Nuclear Science, Vol. 52, No. 5, October 2005; Niculae, A.; Optimized Readout Methods of Silicon Drift Detectors for High Resolution X-Ray Spectroscopy, 2005 Denver X-ray Conference, Colorado Springs, 5 Aug. 2005). As noted by Fiorini, feedback to the FET output (drain) can help reduce peak shift (shift in the peak on an intensity/counts vs. measured energy scale), but it does not solve the problem of resolution degradation. Peak shift can also be reduced by using feedback to control the source current, as described in European Patent Application EP 1 650 871 A1.

Another method for reducing degradation at high count rates is to use a "pulsed reset," wherein the FET input (gate) is reset through a diode after a predetermined period to some datum range or value of voltage(s). This method, which is discussed in the Niculae reference above, is in contrast to "continuous reset" methods, which use leakage current in the FET to discharge the gate (Bertuccio et al., Silicon drift detector with integrated p-JFET for continuous discharge of collected electrons through the gate junction, Nucl. Instr. & meth. A 377 (1996)).

Despite all of the foregoing methods, additional methods would be useful, since most of the foregoing methods do not significantly assist in reducing one or more of peak shift and resolution degradation, and in any event further reduction in peak shift and resolution degradation would be useful.

SUMMARY OF THE INVENTION

The invention, which is defined by the claims set forth at the end of this document, is directed to X-ray detectors which at least partially alleviate the aforementioned problems. A basic understanding of some of the features of preferred versions of the detectors can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring to FIG. 1 for a schematic depiction of a basic exemplary version of the invention, a sample 10 (e.g., a sample for microanalysis) is "illuminated" by an electron beam, X-ray beam, or other beam 12 suitable to cause X-ray emissions 14 from the sample. The X-ray detector 100, which may be considered to include the remaining elements shown in FIG. 1, then receives the X-rays 14 and provides an output signal $V_{OUT}$ corresponding to the timing and energy of the constituent photons of the X-rays 14. The X-rays 14 are received by a semiconductor detector 102, which preferably takes the form of an SDD (Silicon Drift Detector) and which is schematically depicted as a power source since the impinging photons of the X-rays 14 will induce corresponding charges in the semiconductor detector 102.

A voltage-controlled resistance 104 is then provided, and has an input terminal 106 (connected in communication with the semiconductor detector 102), an output terminal 108, and a control voltage supply terminal 110, wherein the output terminal 108 is biased by the control voltage terminal 110

(which is preferably supplied with an at least substantially constant voltage supply $V_{DD}$) to have a voltage at least substantially proportional to the voltage at the input terminal 106. The voltage-controlled resistance 104 preferably takes the form of a field effect transistor (FET) operating in its ohmic/triode range, with gate (FET input) 106, source (FET output) 108, and drain (voltage supply) 110, and thus the remainder of this discussion will assume a FET is used as the resistance 104. A current source 112 is usefully provided to assist in biasing the FET 104 at the gate 106. As a result of this arrangement, the voltage at the source/output terminal 108 varies in accordance with the time and energy of the X-ray photons 14 incident on the semiconductor detector 102.

Since the charge at the gate 106 may over time build to such an extent that the FET 104 will saturate (i.e., no longer operate as a voltage-controlled resistance), a feedback circuit 114 is then usefully provided between the source/output terminal 108 and the gate/input terminal 106. The feedback circuit 114 includes a reset control circuit (depicted generically in FIG. 1 at 116) which supplies a reset voltage signal to the gate/input terminal 106 (i.e., a voltage discharging the gate/input terminal 106 and "resetting" the FET 104) if the voltage of the source/output terminal 108 attains a threshold magnitude. Preferably, the feedback circuit 114 receives the source/output terminal 108 voltage through a buffer 118, which is depicted as an inverting amplifier. The feedback circuit 114 additionally includes a diode 120 having its cathode side 122 at the gate/input terminal 106, thereby enforcing one-way current flow through the feedback circuit 114 from the source/output terminal 108 to the gate/input terminal 106, but not from the gate/input terminal 106 to the source/output terminal 108. Owing to the feedback circuit 114, and more particularly the reset control circuit 116, the FET 104 (and more specifically the voltage of the source/output terminal 108) is constrained to operate within a predefined range—a range having substantially linear input/output characteristics—such that the voltage at the source/output terminal 108 more accurately reflects the charge at the gate/input terminal 106, and thus the timing and energy of received X-ray photons 14 at the semiconductor detector 102. Note that the phantom/dashed-line block 124, which includes the semiconductor detector 102, FET 104, and diode 120, is depicted because the FET 104 and diode 120 can be provided on board the chip for the semiconductor detector 102, and thus these components can be conveniently provided as a unitary assembly.

FIG. 2 then depicts the X-ray detector of FIG. 1 with an exemplary version of the reset control circuit. Here, as with the X-ray detector 100, the X-ray detector 200 includes a semiconductor detector 202; a voltage-controlled resistance (FET) 204 having an input terminal (gate) 206, an output terminal (source) 208 providing an output voltage $V_{OUT}$ through a buffer 218, and a voltage supply terminal (drain) 210; and a feedback circuit 214 with diode 220. The reset control circuit 116 of FIG. 1 is here depicted as including a comparator 226 (which will be referred to as a "reset comparator" for reasons discussed below), a pulse generator 228, and a capacitor 230. The reset comparator 226 receives the voltage $V_{OUT}$ from the source 208 (with $V_{OUT}$ actually being proportional to the inverted source 208 voltage, if the buffer 218 is an inverting amplifier), and causes a reset (discharging) signal to be sent to the gate 206 if $V_{OUT}$ attains a threshold magnitude. This is done by the reset comparator 226 comparing $V_{OUT}$ to an at least substantially constant threshold voltage $V_{THR}$, and providing an output signal to the pulse generator 228 when $V_{OUT}$ is greater than the threshold voltage $V_{THR}$. In response, the pulse generator 228 outputs a discrete reset voltage signal pulse to the gate 206 which discharges it, and thereby resets $V_{OUT}$ into an acceptable range. The capacitor 230 is useful to communicate the reset voltage signal pulse to the gate 206 while blocking sustained/DC signals.

FIG. 3 then illustrates the X-ray detector of FIG. 1 with another exemplary version of the reset control circuit. Here the X-ray detector 300 includes components as in the X-ray detector 200, but another comparator 332—which will be referred to as a protection comparator for reasons that will shortly be apparent—is also interposed between the output terminal (source) 308 (via the buffer 318) and the input terminal (gate) 306, and in parallel with the pulse generator 328 and reset comparator 326. As in the X-ray detector 200, if the voltage of the source 308 (as reflected by $V_{OUT}$) attains a threshold magnitude $V_{THR1}$, the reset comparator 326 causes the pulse generator 328 to issue a reset voltage signal pulse to discharge the gate 306, and thereby reset the voltage of the source 308 (and thus $V_{OUT}$) to a desired level. However, in some cases a single brief reset voltage signal pulse may be insufficient to discharge the gate 306. Subsequent pulses from the pulse generator 328 may then be sufficient, but it would be preferable to more rapidly discharge the gate 306 without the need to await subsequent pulses. Thus, the protection comparator 332 is provided so that if the voltage of the output terminal (as reflected by $V_{OUT}$) attains a threshold magnitude $V_{THR2}$ (which may be set equal to $V_{THR1}$), the protection comparator 332 supplies a sustained reset voltage signal to the gate 306, one which remains so long as $V_{OUT}$ has a magnitude exceeding a predetermined voltage level. Thus, in the X-ray detector 300, the reset comparator 326 supplies at least a portion of the reset voltage signal to the gate 306 if the output voltage $V_{OUT}$ attains a first threshold magnitude $V_{THR1}$, and the protection comparator 332 supplies at least a portion of the reset voltage signal to the gate 306 if the output voltage $V_{OUT}$ attains a second threshold magnitude $V_{THR2}$ (wherein $V_{THR2}$ may equal to $V_{THR1}$).

FIG. 4 then illustrates yet another exemplary X-ray detector 400, wherein the X-ray detector 100 (and/or 200/300) is provided in a charge-sensitive amplifier arrangement. A capacitance $C_{FB}$ is provided in parallel with the feedback circuit 414, which includes the reset control circuit 416 and diode 420. It is notable that the capacitance $C_{FB}$ need not be provided by a conventional capacitor, and it could instead (or also) be merely provided as the stray capacitance of the semiconductor detector 402 (e.g., the stray capacitance of the inner guard ring of an SDD semiconductor detector 402). Such a stray capacitance would more accurately be depicted within the detector block 424, rather than outside it. Here, the buffer 418 should take the form of an inverting amplifier with nonunity gain, whereas the buffers 118/218/318 of the detectors 100/200/300 need not be inverting and may have unity gain (though use of a nonunity-gain inverting amplifier is preferred in all detectors).

FIG. 5 illustrates still another exemplary X-ray detector 500, one which modifies the X-ray detector 200 of FIG. 2 to incorporate additional useful features. Here the reset comparator 526—depicted as an operational amplifier with hysteresis (i.e., a lag in output)—has an additional input $V_{OFF}$, as well as inputs $V_{OUT}$ and $V_{THR}$. Inputs $V_{OUT}$ and $V_{THR}$ operate as in the detector 200: when the reset comparator 526 receives a voltage $V_{OUT}$ from the source 508 which is greater than a threshold voltage $V_{THR}$, a reset (discharging) signal is sent to the gate 506 (preferably via a pulse generator 528, similarly to the detector 200). However, since a single pulse or other reset signal may be insufficient to fully discharge the gate 506, in this case the reset comparator 526 exhibits hysteresis, and continues to deliver the reset signal (and thereby activate the pulse generator 528, if present) even if $V_{OUT}$ thereafter drops below the threshold voltage $V_{THR}$. If $V_{OUT}$ subsequently drops to a turn-off magnitude $V_{OFF}$—$V_{OFF}$ being less than $V_{THR}$—the reset comparator 526 will then halt the reset signal until $V_{OUT}$ once again reaches the threshold voltage $V_{THR}$. This arrangement advantageously maintains the reset signal (e.g., continues to deliver discharging pulses) at the gate 506 until $V_{OUT}$ drops to a desired level (which is in part determined by $V_{OFF}$).

Further features and advantages of the invention will be apparent from the remainder of this document in conjunction with the associated drawings.

DETAILED DESCRIPTION OF PREFERRED VERSIONS OF THE INVENTION

Figure 1:
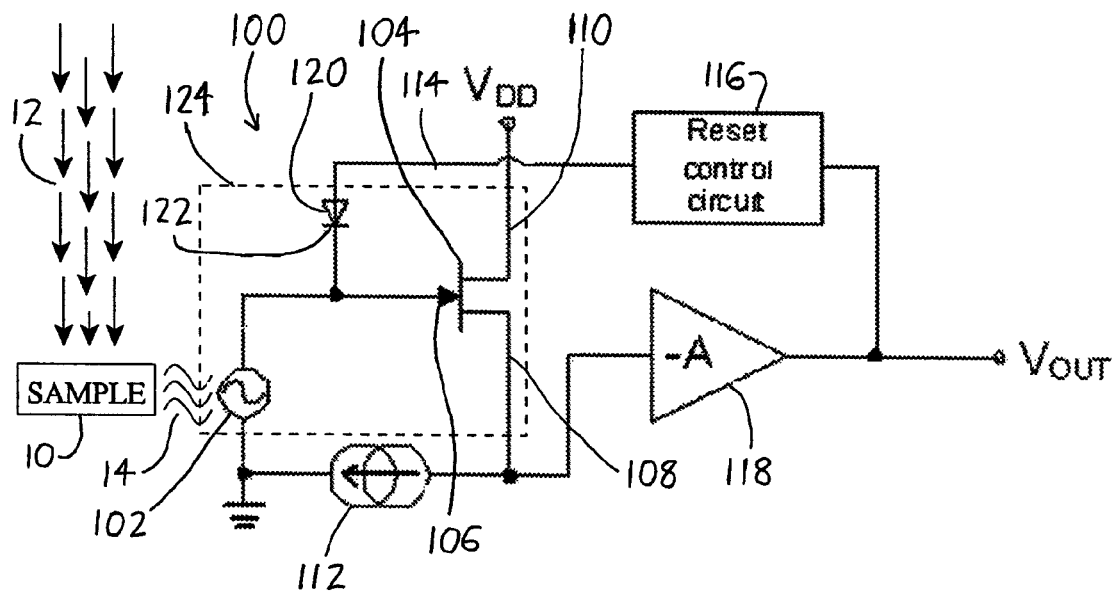
FIG. 1 is a schematic circuit diagram depicting a first X-ray detector 100 exemplifying the invention.

Following is a list of exemplary components that may be used in the foregoing detectors, though it should be understood that any other suitable components may be used.

The semiconductor detectors 102/202/302/402/502 (and more generally the detector chips/blocks 124/224/324/424/524) may take the form of PSD-10-130, PSD-30-140, or SD3-10-128 Silicon Drift Detector modules from PNSensor GmbH (Munich, Germany), which usefully have an onboard FET.

The amplifiers/buffers 118/218/318/518 may take the form of the AD829 operational amplifier (Analog Devices, Norwood, Mass., USA) operating in net unity gain. However, this is not preferred for the amplifier 418, which has nonunity gain for optimal operation. Thus, the amplifiers 118/218/318/418/518 may take the form of a two-stage amplifier using the foregoing AD829 operational amplifier, e.g., with the first stage amplifier providing a non-inverting voltage gain of 16, and the second stage amplifier providing an inverting voltage gain of 4 (and with the stages being frequency-compensated for fast response with maximum signal to noise).

In the X-ray detectors 200 and 300, the reset comparators 226/326 and protect comparator 332 may utilize the LM311 high-speed comparator (National Semiconductor, Santa Clara, Calif., USA) for sensing the voltage level of the amplifiers/buffers 118/218/318/418. The pulse generator 228/328 may utilize the CD4538 monostable multivibrator (National Semiconductor). Alternatively, the pulse generator 228/328 may be generated from a current source using a transistor (e.g., the MMBT5087 PNP transistor from Motorola, Schaumburg, Ill., USA), an arrangement which is preferred when the protect comparator 332 is used.

In the X-ray detector 500, the reset comparator 526 can be built from a comparator having resistive feedback, as described in Chapter 4 of the Second Edition of Horowitz & Hill's The Art of Electronics (Cambridge University Press, 1990). A high-speed comparator, e.g., the MAX912 or MAX913 comparators (Maxim Integrated Products, Sunnyvale, Calif., USA), can allow quick response and can be used to operate an oscillator circuit (the pulse generator 528) as described in Chapter 5 of Horowitz & Hill. The pulse width of the pulse generator 528 could be controlled by using a monostable multivibrator, e.g., the CD4538BC dual precision monostable (Fairchild Semiconductor Corporation, Portland, Me., USA).

Detectors in accordance with the invention can readily accomplish minimal peak shift and resolution degradation at extremely high count rates, with the components discussed above providing peak shift of less than 2 eV in the 10-100 kcps count range. Further, the resolution degradation (increase in Full Width at Half Maximum or FWHM) is statistically insignificant (repeatability of measurements is ±1 eV). A comparison of these results with those reported in the references noted at the outset of this document shows that the invention appears to have performance exceeding all prior arrangements. In addition, the invention is believed superior to prior "resetting" methods insofar as resets are only imposed if/when the source voltage (and thus $V_{OUT}$) reaches the end of its acceptable range. Since the gate cannot collect charge from incident x-rays during resetting—i.e., since counts are "lost" during resetting—the invention minimizes reset events, and thus minimizes lost counts.

Figure 5:
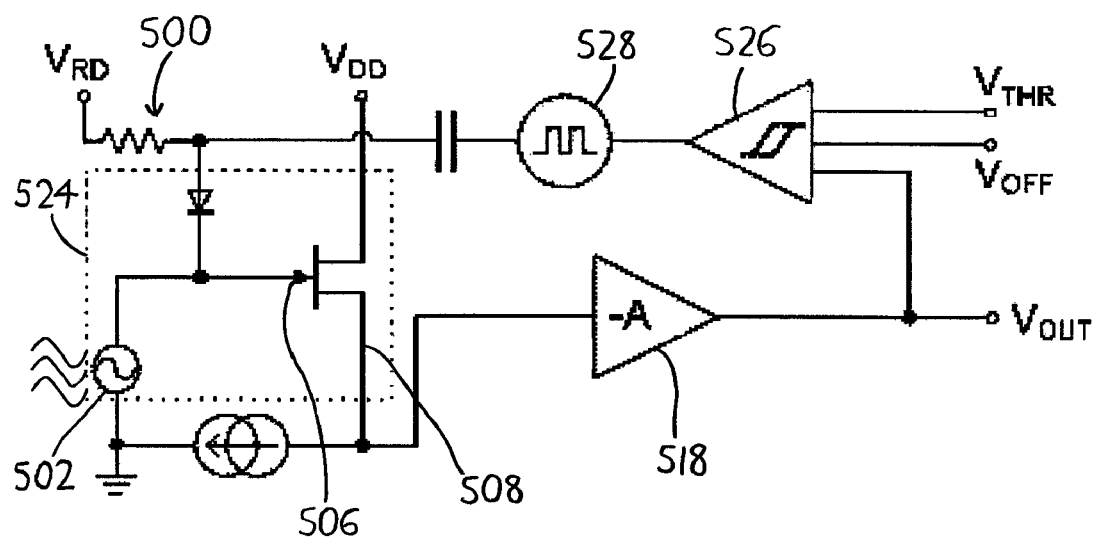
FIG. 5 is a schematic circuit diagram depicting an X-ray detector 500 which resembles the X-ray detector 200 of FIG. 2, but wherein the reset comparator 526 supplies a reset voltage signal to the gate 506 if $V_{OUT}$ reaches or exceeds a threshold magnitude $V_{THR}$, and the reset voltage signal thereafter remains on until $V_{OUT}$ drops to or below a turn-off magnitude $V_{OFF}$.

The detector 500 of FIG. 5 is particularly preferred because it has been found to allow input count rates in excess of 1.5 Mcps, using high-resolution detectors 502 (and detector chips/blocks 524) available as of 2007. Where a single reset pulse is sufficient to bring $V_{OUT}$ to the desired level, only a single reset pulse is delivered, but if a single pulse is insufficient, pulses are delivered until $V_{OUT}$ attains the desired level. It should be understood that within the string of pulses generated by the pulse generator 528, pulses may vary—for example, successive pulses may differ in amplitude, width, shape, and/or duty cycle—until $V_{OUT}$ reaches the desired level.

Figure 2:
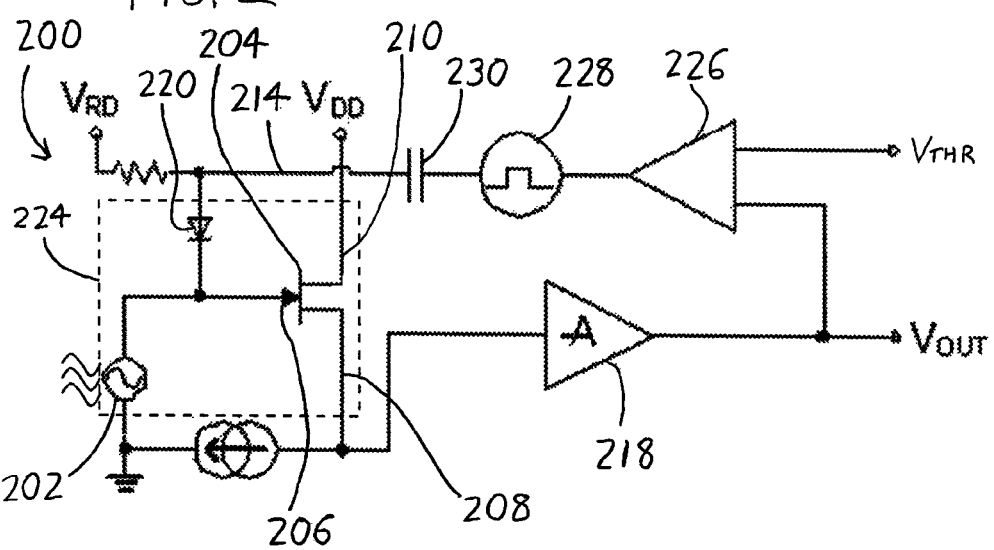
FIG. 2 is a schematic circuit diagram depicting an X-ray detector 200 generally corresponding to the X-ray detector 100 of FIG. 1, but wherein the reset control circuit 116 is provided by a reset comparator 226, a pulse generator 228, and a capacitor 230.
Figure 3:
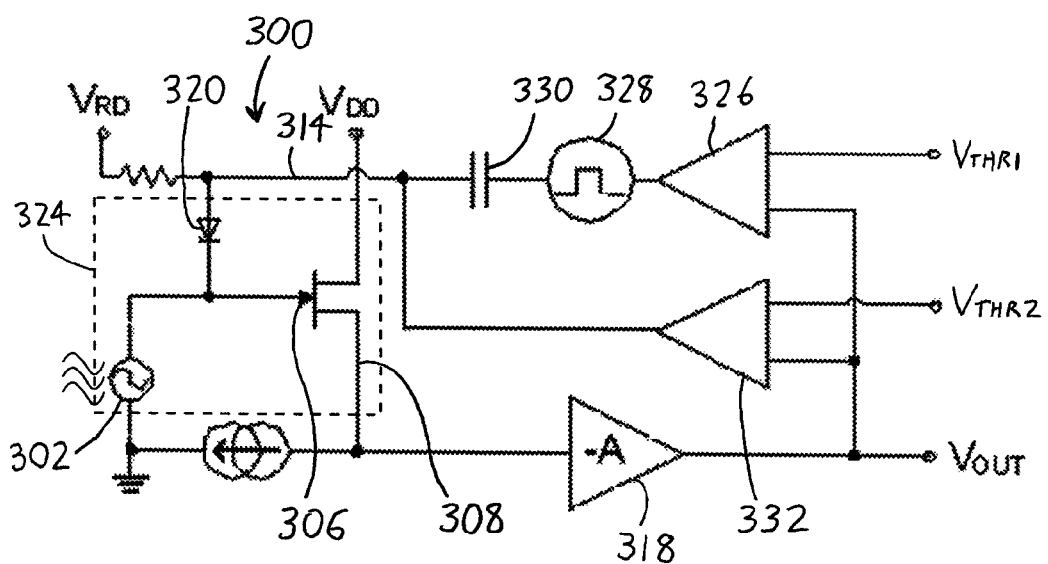
FIG. 3 is a schematic circuit diagram depicting an X-ray detector 300 which also generally corresponds to the X-ray detector 100 of FIG. 1, but wherein the reset control circuit 116 is provided by a protection comparator 332 in parallel with a reset comparator 326, pulse generator 328, and capacitor 330.
Figure 4:
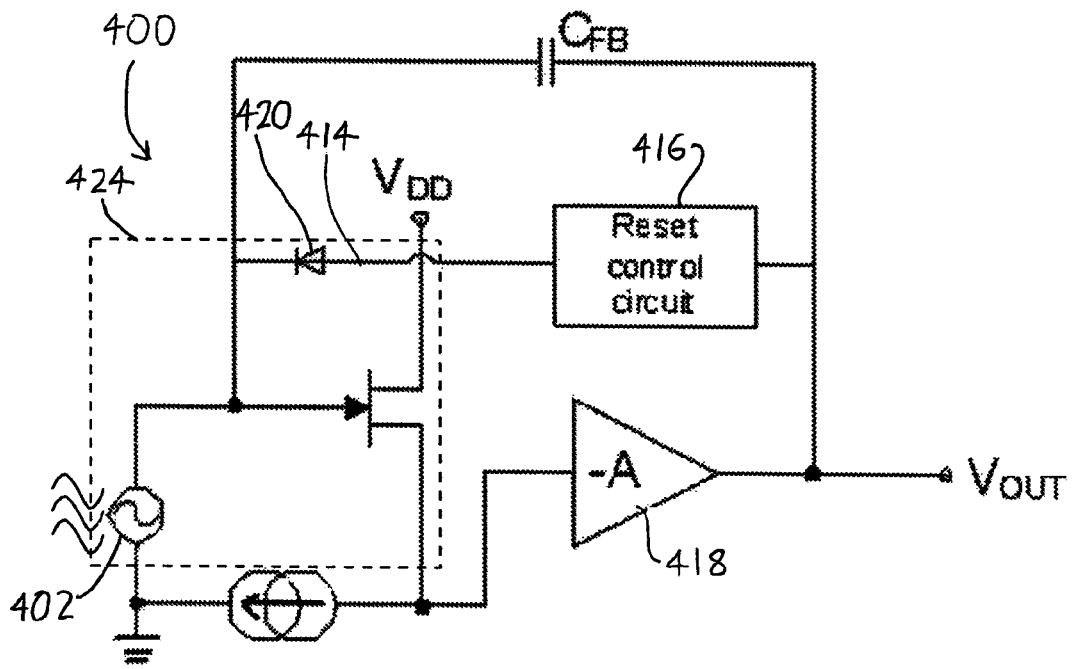
FIG. 4 is a schematic circuit diagram depicting an X-ray detector 400 wherein the X-ray detector 100 is adapted into a charge-sensitive amplifier arrangement, with a capacitor $C_{FB}$ in parallel with the feedback circuit 414.

It should also be understood that the detector arrangements described above are merely exemplary, and detectors in accordance with the invention can include different components in different arrangements. As an example, the X-ray detectors 200 and 300 of FIGS. 2 and 3 depict a voltage $V_{RD}$ also being supplied to the feedback circuits 214 and 314 to reverse-bias the diodes 220 and 320. This arrangement is useful to assist in noise reduction, but is not mandatory. Further, other reset control circuit arrangements are possible apart from those discussed above. As one example, a time delay can be incorporated into the feedback circuit 214/314 so that the reset pulse issued by the pulse generator 228/328, and/or the reset signal issued by the protection comparator 332, is supplied to the gate after a delay, thereby allowing adequate time to register the count (X-ray photon impingement) giving rise to the reset pulse/signal. Additionally, other voltage-controlled resistances may be used in place of a FET 204; other buffers could be used in place of inverting amplifiers 118/218/318/418; and so forth.

In summary, the invention is not intended to be limited to the exemplary versions described above, but rather is intended to be limited only by the claims set out below. Thus, the invention encompasses all different versions that fall literally or equivalently within the scope of these claims.

What is claimed is:

1. An x-ray detector including:
   a) a semiconductor detector;
   b) a voltage-controlled resistance having:
      (1) a voltage supply,
      (2) an input terminal in communication with the semiconductor detector, and
      (3) an output terminal,
         wherein the output terminal is biased by the voltage supply to have a voltage dependent on the voltage at the input terminal;
   c) a feedback circuit between the output terminal and the input terminal, wherein the feedback circuit includes a comparator configured to supply a reset voltage signal to the input terminal if the voltage of the output terminal attains a threshold magnitude, and wherein the comparator is further configured to continue to supply the reset voltage signal to the input terminal until the voltage of the output terminal attains a turn-off magnitude, the turn-off magnitude being less than the threshold magnitude.

2. The x-ray detector of claim 1 wherein the semiconductor detector is a silicon drift detector (SDD).

3. The x-ray detector of claim 1 wherein the voltage-controlled resistance includes a field effect transistor having:
   a) a drain in communication with the voltage supply;
   b) a gate in connection with the input terminal, and
   c) a source in connection with the output terminal.

4. The x-ray detector of claim 1 wherein the feedback circuit allows current flow from the output terminal to the input terminal, but not from the input terminal to the output terminal.

5. The x-ray detector of claim 1 wherein the feedback circuit includes a diode having a cathode in communication with the input terminal.

6. The x-ray detector of claim 1 wherein the feedback circuit further includes a pulse generator, wherein the pulse generator is configured to be activated by the comparator so as to send one or more reset voltage signal pulses to the input terminal if the voltage of the output terminal attains the threshold magnitude.

7. The x-ray detector of claim 6 further including a capacitor interposed between the pulse generator and the input terminal.

8. The x-ray detector of claim 6 wherein the comparator comprises a reset comparator.

9. The x-ray detector of claim 8 wherein the reset comparator is configured to continually trigger the pulse generator so as to supply the one or more reset voltage signal pulses to the input terminal until the voltage of the output terminal attains a turn-off magnitude, the turn-off magnitude being less than the threshold magnitude.

10. The x-ray detector of claim 8 further including a protection comparator interposed between the output terminal and the input terminal, and in parallel with the pulse generator and the reset comparator, wherein the protection comparator is configured to supply a sustained reset voltage signal to the input terminal if the voltage of the output terminal attains a threshold magnitude.

11. The x-ray detector of claim 1 wherein the feedback circuit includes:
   a second comparator interposed between the output terminal and the input terminal, and in parallel with the comparator additionally configured to supply at least a portion of the reset voltage signal to the input terminal if the voltage of the output terminal attains a first threshold magnitude, and wherein the second comparator is configured to supply at least a portion of the reset voltage signal to the input terminal if the voltage of the output terminal attains a second threshold magnitude.

12. An x-ray detector including:
   a) a semiconductor detector;
   b) a FET having:
      (1) a gate in communication with the semiconductor detector;
      (2) a drain maintained at an at least substantially constant drain voltage; and
      (3) a source,
   c) a feedback circuit between the source and the gate, wherein the feedback circuit includes a comparator configured to supply a voltage signal to the gate if the source voltage attains a threshold magnitude, and wherein the comparator is further configured to supply the voltage signal to the gate until the source voltage drops below a turn-off magnitude which is less than the threshold magnitude.

13. The x-ray detector of claim 12 further including a pulse generator, wherein the comparator is configured to activate the pulse generator so as to supply the voltage signal to the gate if the source voltage attains the threshold magnitude.

14. The x-ray detector of claim 12 wherein the feedback circuit includes a capacitor between the comparator and the gate.

15. The x-ray detector of claim 14 further including a second comparator in parallel with the capacitor, wherein the second comparator is configured to supply a protect voltage signal to the gate if the source voltage attains a second threshold magnitude.

16. The x-ray detector of claim 15 further including a pulse generator in series with the capacitor and in parallel with the second comparator.

17. An x-ray detector including:
   a) a semiconductor detector;
   b) a PET having:
      (1) a gate in communication with the semiconductor detector;
      (2) a drain maintained at an at least substantially constant drain voltage; and
      (3) a source,
   c) a feedback circuit between the source and the gate, wherein the feedback circuit includes:
      (1) a comparator receiving:
         (a) an at least substantially constant threshold voltage, and
         (b) a voltage proportional to the voltage of the source, the comparator configured to provide an output signal when the proportional voltage is greater than the threshold voltage; and
      (2) a pulse generator in communication with the comparator, wherein the pulse generator is configured to output one or more reset voltage signal pulses upon receiving the comparator output signal.

* * * * *

UNITED STATES PATENT AND TRADEMARK OFFICE
CERTIFICATE OF CORRECTION

PATENT NO. : 7,554,091 B2
APPLICATION NO. : 12/023960
DATED : June 30, 2009
INVENTOR(S) : Drummond et al.

It is certified that error appears in the above-identified patent and that said Letters Patent is hereby corrected as shown below:

Claim 17, column 8, line 45:
replace "b) a PET having:"
with --b) a FET having:--

Signed and Sealed this

Twenty-ninth Day of September, 2009

David J. Kappos
*Director of the United States Patent and Trademark Office*